United States Patent
Matera

(10) Patent No.: US 8,303,109 B2
(45) Date of Patent: *Nov. 6, 2012

(54) EYEWEAR DEVICE AND METHOD OF MAKING THE SAME

(76) Inventor: Pasquale Matera, Plainview, NY (US)

( * ) Notice: Subject to any disclaimer, the term of this patent is extended or adjusted under 35 U.S.C. 154(b) by 192 days.

This patent is subject to a terminal disclaimer.

(21) Appl. No.: 12/825,319

(22) Filed: Jun. 28, 2010

(65) Prior Publication Data

US 2011/0001921 A1    Jan. 6, 2011

Related U.S. Application Data

(63) Continuation-in-part of application No. 11/979,423, filed on Nov. 2, 2007, now Pat. No. 7,744,211.

(60) Provisional application No. 60/861,737, filed on Nov. 30, 2006.

(51) Int. Cl.
*G02C 11/08* (2006.01)

(52) U.S. Cl. .............................. 351/62; 2/435

(58) Field of Classification Search ............. 351/62, 351/41, 158; 2/435, 436, 437
See application file for complete search history.

(56) References Cited

U.S. PATENT DOCUMENTS

| | | | |
|---|---|---|---|
| 163,648 A | 5/1875 | Gall | |
| 3,015,987 A | 1/1962 | Harrison | |
| 5,018,223 A | 5/1991 | Dawson et al. | |
| 5,638,145 A | 6/1997 | Jannard et al. | |
| 5,711,035 A | 1/1998 | Haslbeck | |
| 5,969,787 A | 10/1999 | Hall et al. | |
| 6,783,235 B1 | 8/2004 | Lin | |
| 6,971,745 B2 | 12/2005 | Sheldon | |
| 7,137,153 B2 | 11/2006 | Hussey | |
| 7,744,211 B2 * | 6/2010 | Matera | 351/62 |

* cited by examiner

*Primary Examiner* — Hung Dang
(74) *Attorney, Agent, or Firm* — Kenealy Vaidya LLP

(57) ABSTRACT

An eyewear device can include a frame including an eyewire and a ledge, the eyewire at least partially encircling a lens and the at least one lens resting on the ledge, and a plurality of chamber walls in the ledge between the at least one lens and the frame, wherein the plurality of chamber walls are configured to allow air to circulate between opposite sides of the lens to reduce fogging. A method of producing an eyewear device can include providing a frame comprising an eyewire and a ledge, the eyewire at least partially encircling a lens and the at least one lens resting on the ledge, and providing a plurality of grooves in the ledge between the at least one lens and the frame, wherein the plurality of grooves are configured to allow air to circulate between opposite sides of the lens to reduce fogging.

19 Claims, 10 Drawing Sheets

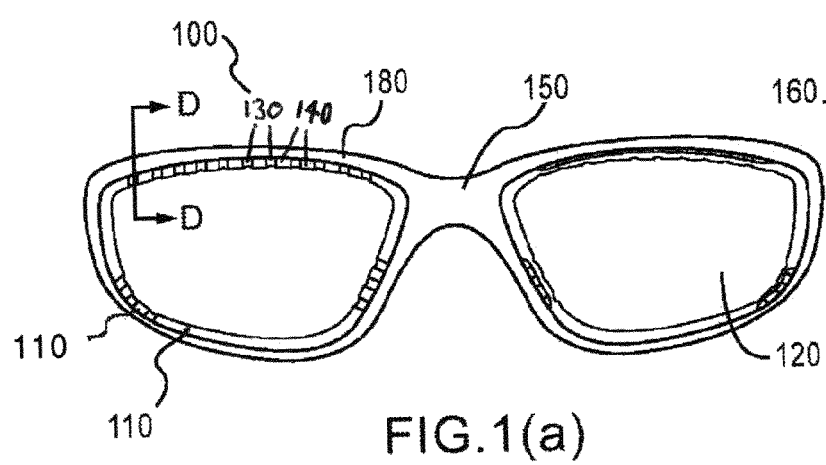
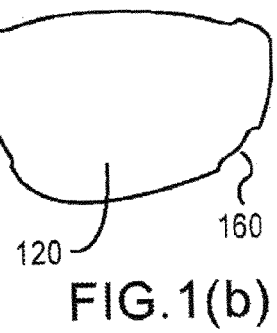
FIG.1(a)
FIG.1(b)
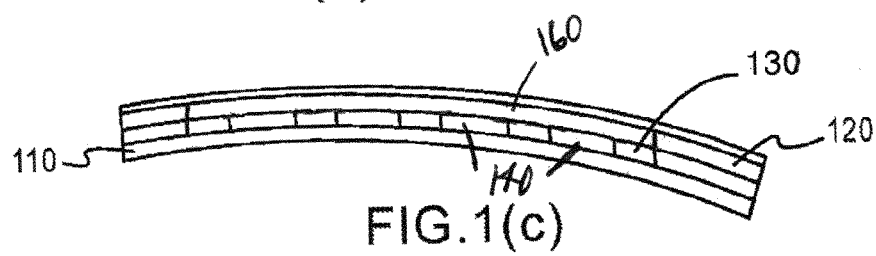
FIG.1(c)
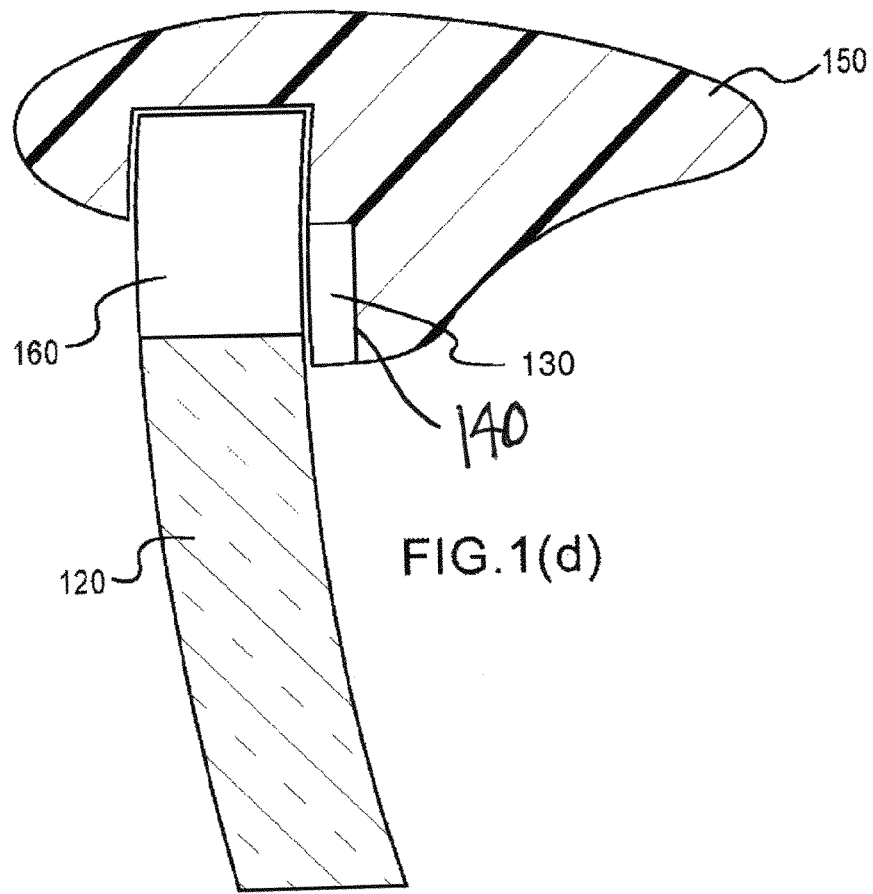
FIG.1(d)

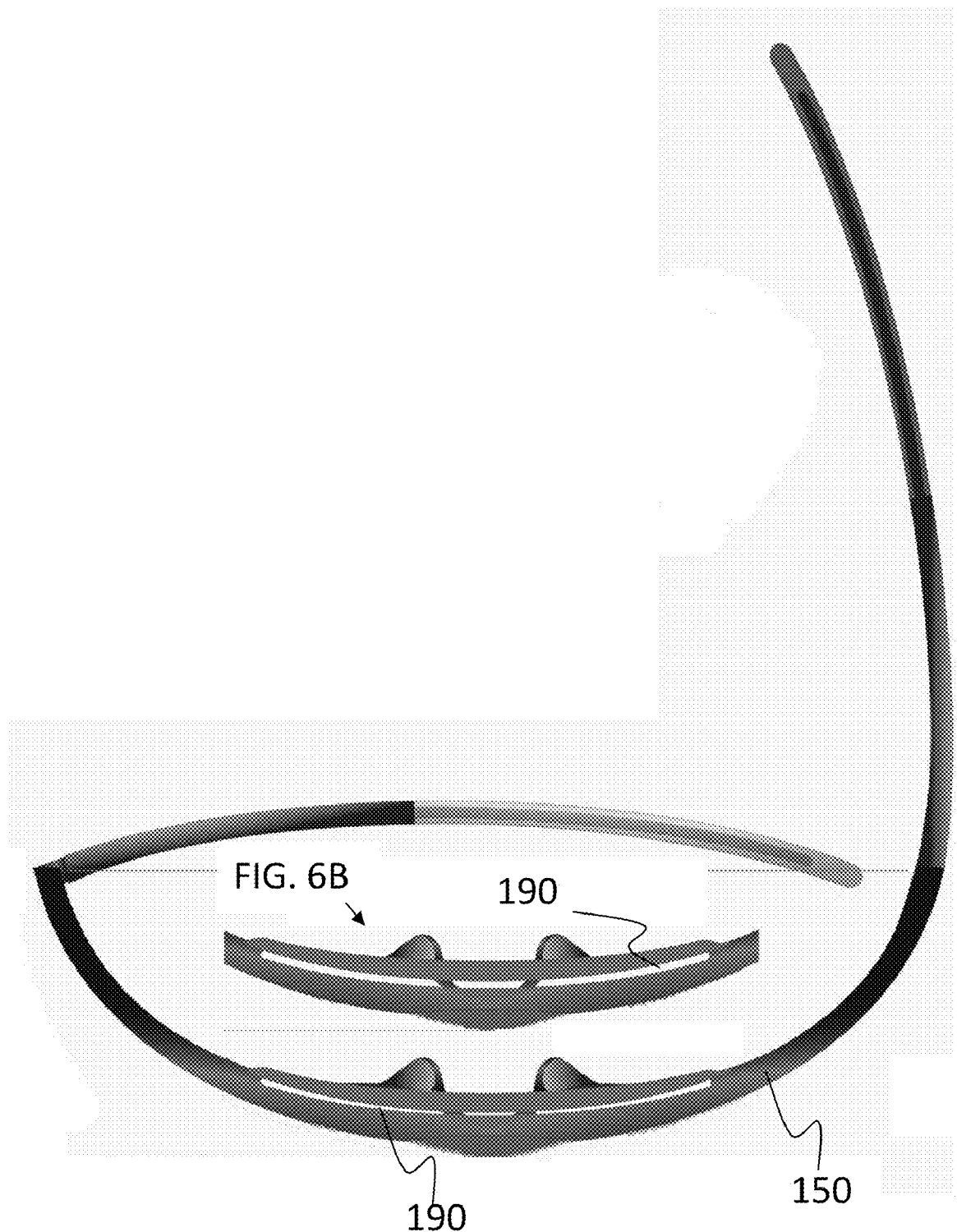

FIG. 9e
FIG. 9f
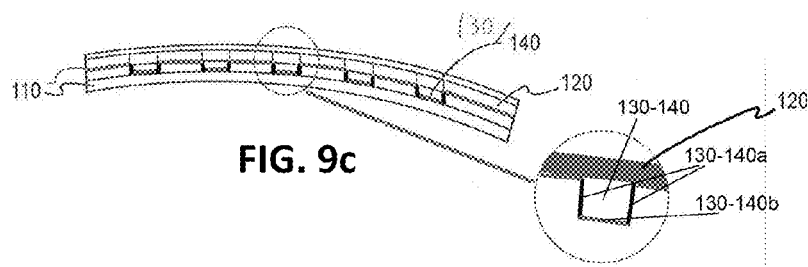
FIG. 9c
FIG. 9d
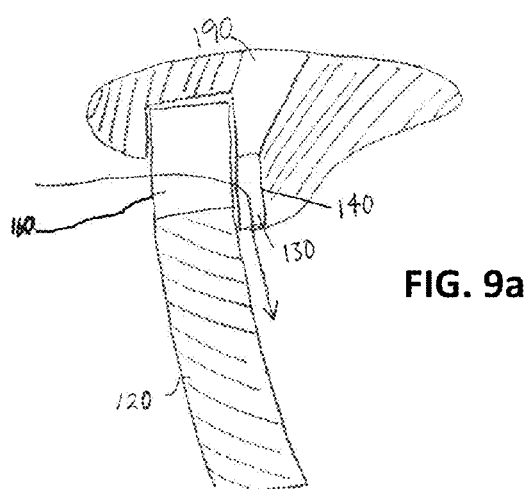
FIG. 9a
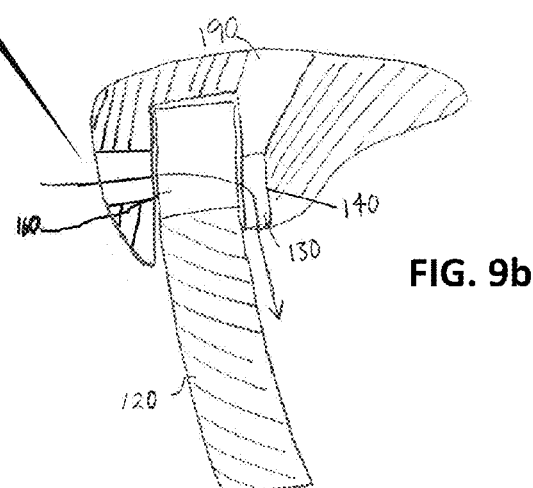
FIG. 9b

EYEWEAR DEVICE AND METHOD OF MAKING THE SAME

This application is a Continuation In Part and claims priority under 35 U.S.C. §120 to U.S. patent application Ser. No. 11/979,423 entitled "Eyewear Device, and Method of Making the Same, That Reduces Fogging," filed Nov. 2, 2007, now U.S. Pat. No. 7,744,211 and in turn under 35 U.S.C. §119 to U.S. Provisional Patent Application No. 60/861,737 entitled "Eyewear Device, and Method of Making the Same, That Reduces Fogging," filed Nov. 30, 2006. Both of the above-referenced patent applications are incorporated by reference herein in their entirety.

BACKGROUND OF THE DISCLOSED SUBJECT MATTER

1. Field of the Disclosed Subject Matter

The presently disclosed subject matter is related to a venting system and method for glasses and goggles. More specifically, the presently disclosed subject matter is directed to a fog reducing system for glasses and goggles and a method of making the same.

2. Description of the Related Art

Currently, glasses are available which are promoted as having fog reducing properties. Usually, such glasses include a series of apertures or holes in or about the lens and or frame front or temples. For example, Lin (U.S. Pat. No. 6,783,235) teaches a pair of fog-free protective glasses with a frame and a lens, wherein the frame has an embedded portion and a pair of temples pivotally connected to two ends of the embedded portion.

Also, Dawson et al. (U.S. Pat. No. 5,018,223) teach non-fogging goggles that include a double lens having a pair of two spaced-apart lenses with an air interstice therebetween and in which the inner surface of the outer lens is coated with a metal film.

In addition to improved or clear vision, conventional glasses provide a wearer with benefits under various conditions. However, such glasses easily fog over, especially when a wearer perspires. Fogging is inconvenient, uncomfortable and may even be dangerous for the wearer. Contact lenses provide clear vision without fog-prone lenses, but cannot provide a windbreak or sunscreen effect like glasses. There is presently, and there has always been, a consistent problem regarding the fogging of lenses of eyeglasses.

The above-described exemplary techniques using designs with holes in the lens have several drawbacks, such as allowing peripheral light and debris to reach the eye. Alternatively, sunglasses promoted as having designs which are vented with "holes" at the outer corners of the frame or temples display another shortcoming in that these designs do not allow enough air to be vented through the holes as to be useful or effective. Therefore, there is a need for sunglasses, glasses or goggles having a practical venting and/or fog reducing system.

SUMMARY OF THE DISCLOSED SUBJECT MATTER

The disclosed subject matter has been attained in view of the features, problems, characteristics, and shortcomings of the conventional techniques described above and those generally known in the art. Various exemplary embodiments of the disclosed subject matter systems and methods can be configured to provide fog-free protective glasses, and particularly glasses having an airflow function for heat convection and for preventing fog from condensing on lenses thereof.

According to various exemplary embodiments and systems of the disclosed subject matter, an eyewear device is provided that can include a frame having an eyewire and a ledge, the eyewire at least partially encircling at least one lens and the at least one lens resting on the ledge, and a plurality of chamber walls in the ledge between the at least one lens and the frame, wherein the plurality of chamber walls are configured to allow enough air to circulate between opposite sides of the at least one lens, wherein fogging is to reduced.

According to various exemplary embodiments and systems, a method of producing an eyewear device is provided that can include providing a frame having an eyewire and a ledge, the eyewire at least partially encircling at least one lens and the at least one lens resting on the ledge, and providing a plurality of chamber walls in the ledge between the at least one lens and the frame, wherein the plurality of chamber walls are configured to allow enough air to circulate between opposite sides of the at least one lens to reduce fogging.

BRIEF DESCRIPTION OF THE DRAWINGS

Various exemplary embodiments of the systems and methods will be described in detail, with reference to the following figures, wherein:

FIG. 1(a) is a front view of an example of an eyewear device made in accordance with principles of the disclosed subject matter, FIG. 1(b) is a front view the lens of FIG. 1(a), FIG. 1(c) is a partial view of a top portion of the eyewear device of FIG. 1(a) as viewed from below, and FIG. 1(d) is a cross sectional view taken along line D-D of FIG. 1(a).

FIGS. 6(a)-(b) show a partial top view and top view of another embodiment of a frame made in accordance with principles of the presently disclosed subject matter in the compressed state and uncompressed state, respectively.

FIGS. 9(a)-(f) show various views of another embodiment of a frame made in accordance with principles of the presently disclosed subject matter.

DETAILED DESCRIPTION OF EXEMPLARY EMBODIMENTS

Figure 2A:
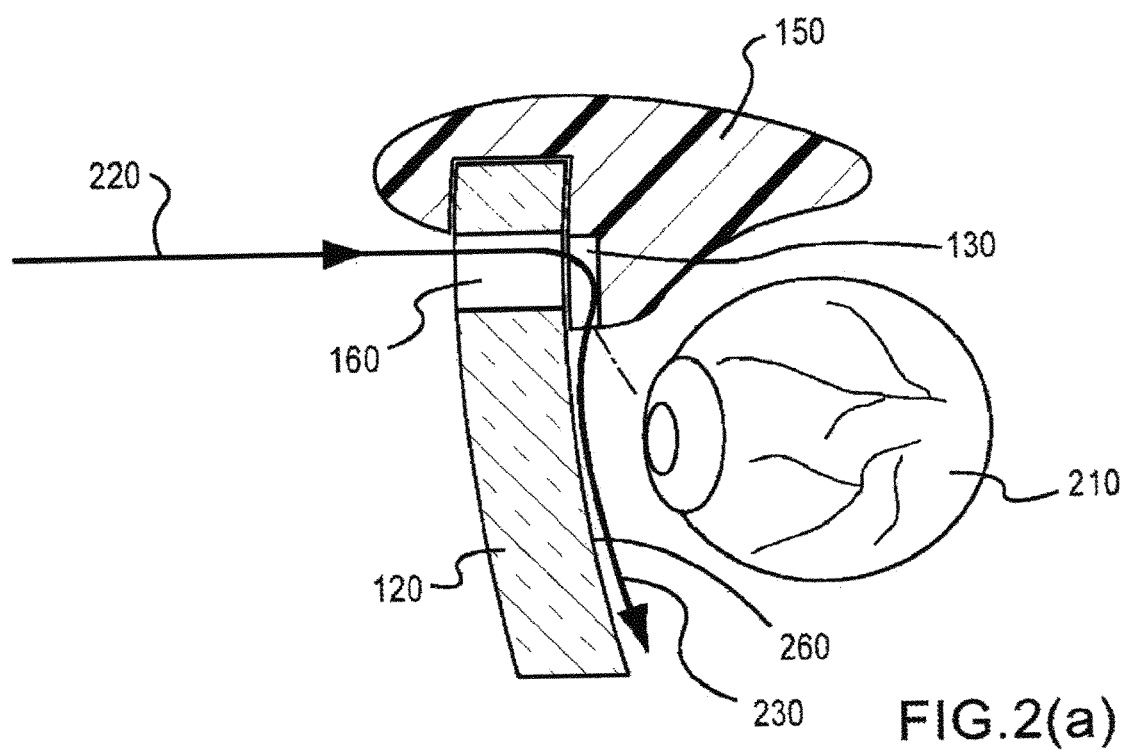
FIGS. 2(a)-(b) are cross-sectional operational side views illustrating another exemplary embodiment of an eyewear device made in accordance with principles of the disclosed subject matter.

These and other features and advantages of the disclosed subject matter are described in, or are apparent from, the following detailed description of various exemplary embodiments of the apparatus, systems and methods.

FIGS. 1(a)-(d) illustrate an example of an eyewear device 100 made in accordance with principles of the disclosed subject matter. As shown in FIG. 1(a), the eyewear device 100 can include a frame 150 holding a lens 120, and the frame 150 can include an eyewire 180 that at least partially encircles the lens 120, and a ledge 110. The ledge 110 may include a plurality of chamber wall structure(s) 140 (e.g. groove(s)). The lens 120 may rest on the ledge 110, and the chamber wall structure(s) 140 may include a first surface(s) that forms the ledge 110 along with other surface(s) that define an expansion chamber, and the lens 120 can rest on the ledge 110. Also, the lens 120 may include at least one, but possibly a plurality, of vents 160 formed as indents extending from a side of the lens 120 inward toward a central portion of the lens 120. The vents 160 can be somewhat scalloped shaped or can be circular, oval, square, non-symmetrical or other shaped. The vent(s) 160 in the lens 120 can cooperate with the frame 150, and in particular with the chamber wall structure(s) 140 of the frame 150, to define inlet air passageways in the front of the eyewear device 100. As shown in FIG. 1(d), the eyewear device 100 may also include an expansion chamber 130 in the frame 150, defined by the chamber wall structure(s) 140 and lens 120, wherein the expansion chamber 130 is located between the body of the frame 150 and a vent 160 of the lens 120. The vents 160 and the expansion chambers 130 and associated air passageways may or may not be located in correspondence with respect to each other. For example, multiple expansion chambers 130 may correspond with a single vent 160 (as shown in FIGS. 1(a)-(d)), multiple vents 160 may correspond with a single expansion chamber 130, or each single vent 160 can correspond with a single expansion chamber 130. Vents 160 may be formed entirely along a single side of the lens or they can be formed on any combination of sides. Similarly, the expansion chambers 130 and chamber wall structure(s) 140 can be formed in the frame 150 at any location or combination of locations around the perimeter of the lens or lenses.

The chamber wall structure(s) 140 can include a back wall, side walls top wall, and a bottom wall. Each of the walls can be uniformly shaped, one with another, or they can vary in size and shape to form a particularly shaped air passageway. For example, the chamber wall structures 140 can form square, rectangular, trapezoidal, oval, or any other shape air passageway. The chamber wall structures 140 can also define the expansion chamber 130, and can be configured to permit flow of air at a particular speed, direction and/or diffusion amount. The chamber wall structure(s) 140 may also form corners or edges at the perimeter of the expansion chamber 130. Alternatively, the chamber wall structure(s) 140 can be formed in a concave shape having a curved continuous surface. Still further, the chamber wall structure(s) 140 can be formed as a plurality of alternating concave and convex shapes such that the valleys form the air passage and possibly a portion of the expansion chamber 130 and the peaks form the ledge 110 upon which the lens 120 can be seated. The chamber wall structure(s) 140 can also be formed in different shapes in order to increase or decrease the volume of the expansion chamber 130.

The chamber wall structure(s) 140 may be formed as a single piece with frame 150 (i.e., molded, stamped or otherwise formed as a single continuous material), or can be formed as an insert that is secured to the frame 150 through bonding, welding, adhering, screwing, friction fitting, press-fitting or another desired fastening method or mechanism. The chamber wall structure(s) 140 can be made of metal, plastic, felt, silicone, resin, wood or any other desired material that can provide the air flow passages desired.

Figure 4A:
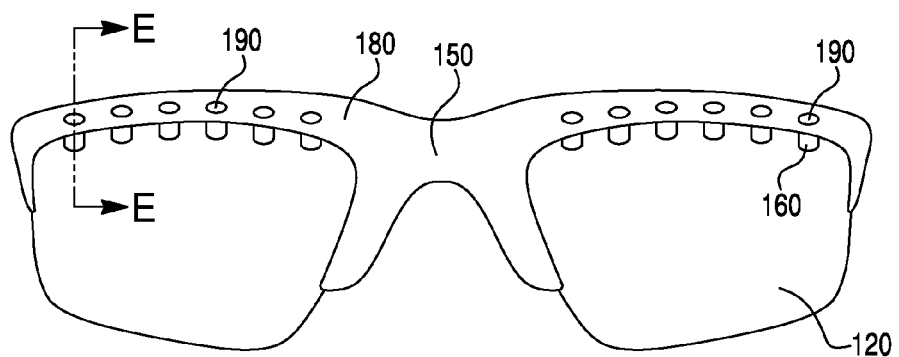
FIG. 4(a) is a front view of another exemplary embodiment of an eyewear device made in accordance with principles of the disclosed subject matter.
Figure 5A:
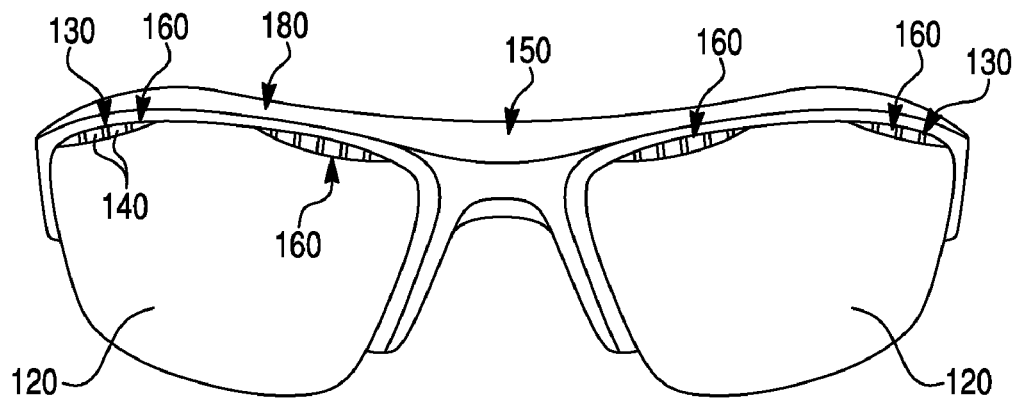
FIG. 5(a) is a front view of another exemplary embodiment of an eyewear device made in accordance with principles of the disclosed subject matter.

The ledge 110 may block peripheral light from penetrating an inside portion of the lens 120. The number and shape of the chamber wall structure(s) 140 and the vents 160 allow for sufficient air mobility between an inside surface of the lens 120 and an outside surface of the lens 120 so that air can easily flow from one side of the lens 120 to the other. As air flows into the expansion chamber 130 it will be guided by the chamber wall structure(s) 140 down the inner side of the lens 120. Alternatively air can flow out through the expansion chamber 130 and through the vents 160 toward the outer side of the lens. The flow of air between the inner and outer side of the lens 120 creates air circulation which reduces the likelihood of moisture or fog accumulating on the lens 120, especially on the inner side of the lens 120. It should be noted that although FIGS. 1(a), 4(a) and 5(a) illustrate the lens 120 as having a faintly oval shape, the lens 120 may have any and all shapes available in any current and future eyewear devices such as glasses or goggles.

The ledge 110 may include a series of channels at the surface of the ledge 110 that make up the chamber wall structure(s) 140. It should also be noted that although the vents 160 in FIG. 1(b) have a quasi-rectangular shape, the vents 160 may have any shape that would allow an easy flow of air between both sides of the lens 120. Any such shapes include rectangular, square, triangular, trapezoidal, or any other shape that may be implemented in any eyewear device.

Figure 2B:
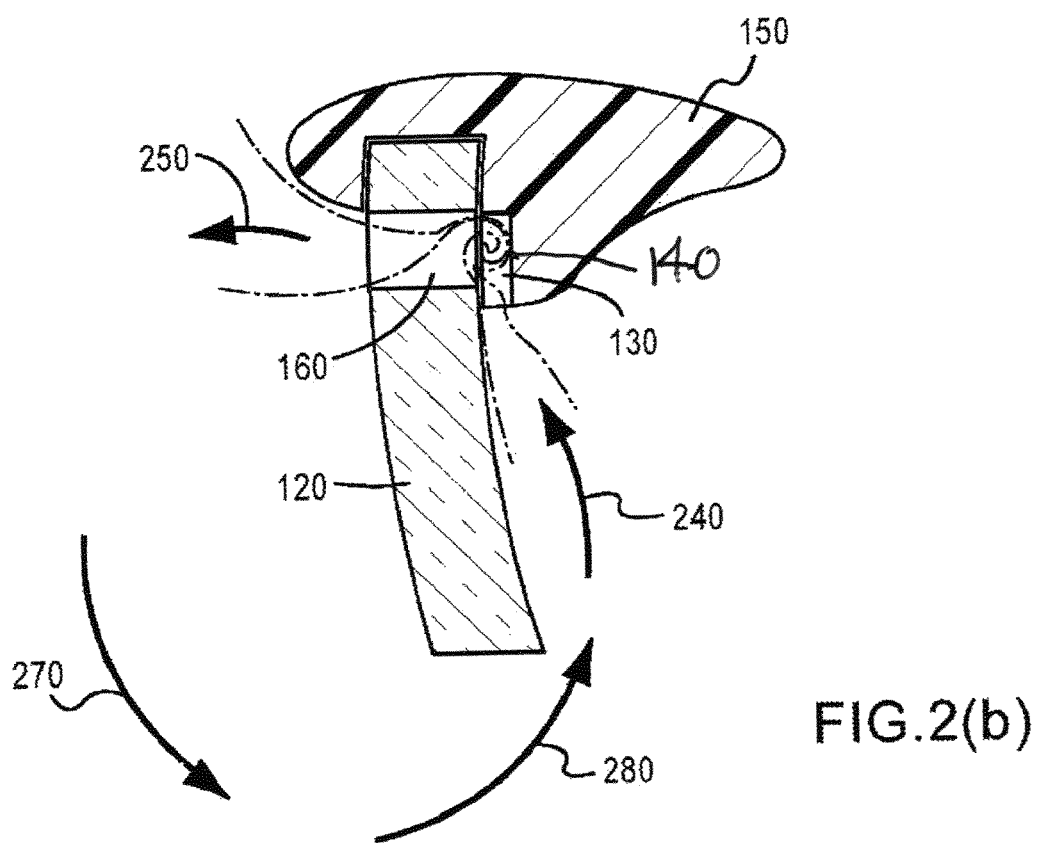

FIGS. 2(a)-(b) illustrate another exemplary embodiment in operation. As illustrated in FIG. 2(a), the air may circulate between the outside of the lens 120 towards the inside of the lens 120, in a direction illustrated by flows 220 to 230. For example, such an air flow may take place if the wearer, represented by the eye 210, is in motion. In this case, the lens 120 may be shaped to allow a maximum amount of air in from the front of the frame 150 through the vents 160 in the lens 120. Accordingly, air may enter inside the frame 150 through the vents 160 and/or the expansion chambers 130 and may be directed inside the frame 150, between the lens 120 and the wearer 210. Thus, air may circulate over the inner surface 260 of the lens 120, thereby reducing fogging. This is called "active" venting, wherein air is forced into the vents 160 or the expansion chambers 130 because of external air pressure, wind, or movement of the wearer 210. Air volume tends to move from outside of the lens 120, with high volume and low pressure, to inside of the lens 120, with high pressure and low volume. This gradient in pressure is due to the outside air being forced into the vents 160, where it is compressed and funneled into a smaller area, on the inner side of the lens 120 and the expansion chamber 130, thus increasing the air pressure and speed. When the air is channeled onto the inside surface 260 of the lens 120, a fog reducing effect is created. It should be noted that the expansion chamber 130 may be located in direct correspondence to, or opposite of, the vents 160 in order to allow an easier flow of air between the inner side 260 of the lens 120 and the outer side of the lens 120 and enhance the fog reduction of the lens 120. Thus, the wearer 210 does not have to regularly pull the lens 120 from his face in order to remove fogging because fogging is reduced or prevented from occurring in the first place.

Alternatively, as illustrated in FIG. 2(b), the air may circulate from the inner side surface 260 of the lens 120 to the outer side surface of the lens 120, as illustrated by the flow 240 to 250. This is called "passive" fog reduction by means of convection. When the air within the space between the wearer 210 and the inner side surface 260 of the lens 120 is heated by, for example, body temperature, the heated air tends to rise upwards, and escapes through the vents 160, as illustrated by the flow 240 to 250. The upward movement of warm air draws cooler air in from the outside at the bottom of the frame, as illustrated by flow 270 to 280. Colder air may then fill the space left by the rising warm air. The new, cold air then heats up and rises and the cycle repeats itself, creating a circular motion and venting of air, thus producing a "passive" fog reducing effect.

Figure 3:
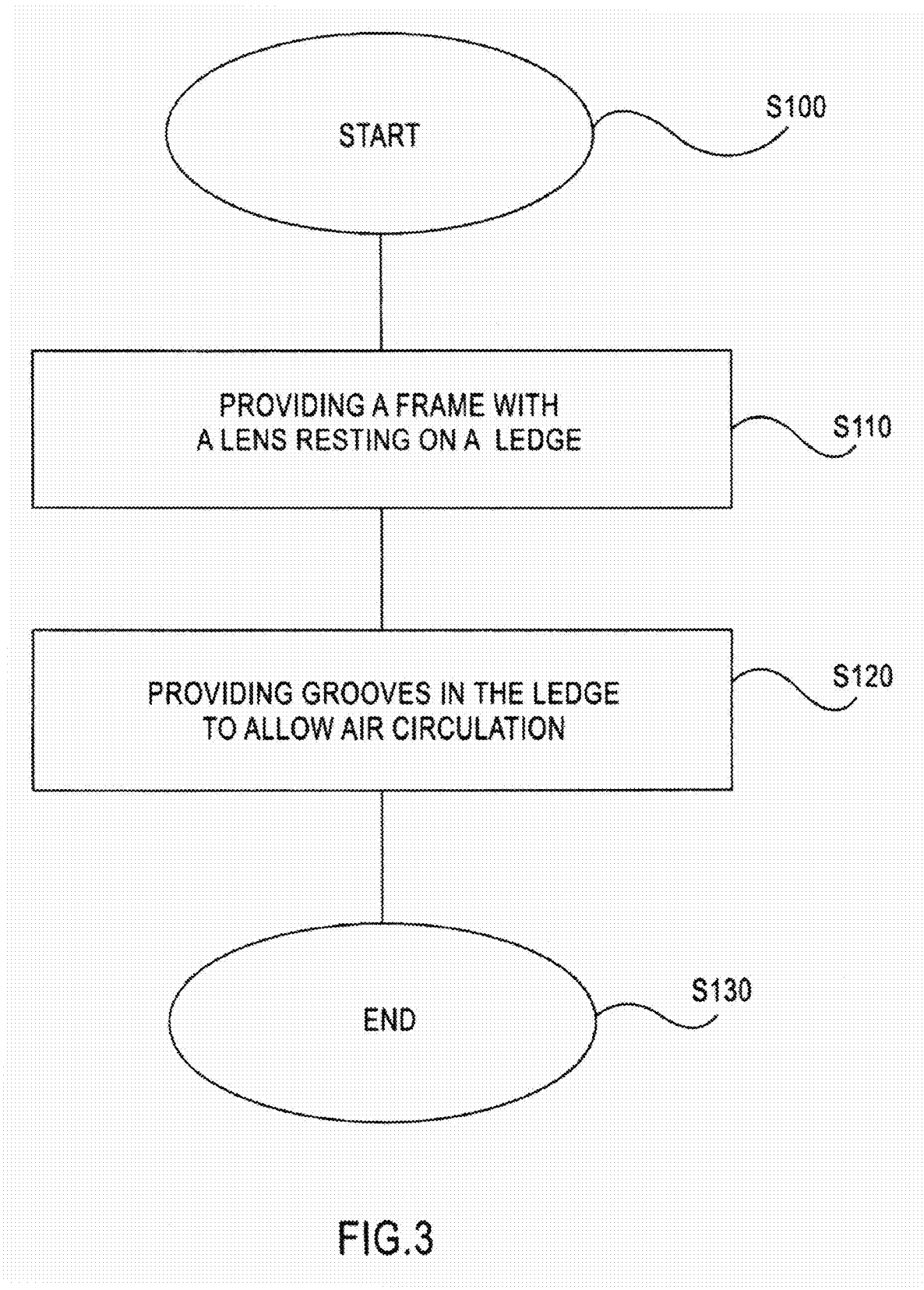
FIG. 3 is a flow diagram illustrating an exemplary method of producing an eyewear device in accordance with principles of the disclosed subject matter.

FIG. 3 is a flow diagram illustrating a method of producing a fog reducing eyewear device. In FIG. 3, the method starts at step S100, and continues to step S110, where an eyewear frame is provided. The frame may include an eyewire and a ledge, and the eyewire can encircle a lens. Alternatively, the eyewire may also be configured to encircle more than one lens, or partially encircle the lens(es). Furthermore, the one or more lenses encircled by the eyewire may be configured to rest on the ledge. Next, the method continues to step S120, where a plurality of grooves (which can be defined by chamber wall structures) are provided in the ledge, between the lens and the main portion of the frame. The grooves may be configured to let enough air circulate between an inner side of the lens and an outer side of the lens to allow fog reduction by achieving temperature uniformity across both sides of the lens. The lens itself may also include vents to let air circulate between an inner side and an outer side of the lens and achieve temperature uniformity, which will result in fog reduction. An expansion chamber may be provided at the inner side of the lens, such that the expansion chamber is in direct correspondence with the vent(s) of the lens to allow an easy flow of air between the inner side and the outer side of the lens. Next, the method continues to step S130, where the method ends.

FIGS. 4(a)-(e) illustrate another exemplary embodiment of an eyewear device according to the disclosed subject matter. The frame 150 and lens 120 can be formed in substantially the same shape and can function in substantially the same way as the exemplary eyewear device disclosed in FIGS. 1(a)-(d). However, the frame 150 shown in FIG. 4(a) can include at least one and possibly a plurality of openings 190 defined by the frame 150. The openings 190 can be formed in a row along the top surface of the eyewire 180, or in other configurations or at any other location of the frame 150.

Each opening 190 can have a central axis that runs therethrough and that intersects a corresponding central axis of each vent 160 (the central axis of each vent 160 extending substantially normal to the front and rear surface of the lens 120 and through a central portion of the opening defined between the frame 150 and lens 120 at each vent 160). The opening 190 can lead to the expansion chamber 130. Thus, air is free to flow through the opening 190 into either the corresponding expansion chamber 130 or the corresponding vent 160 or both, or vice versa (from the expansion chamber 130 and/or vent 160 to the opening 190). Openings 190 can provide additional air circulation between the inner side of the lens 120 and the outer side of the lens 120, thereby aiding in the "passive" and/or "active" venting of the lens and reducing or preventing fog accumulation on the lens 120 as described in reference to FIGS. 2(a)-(b).

Figure 4B:
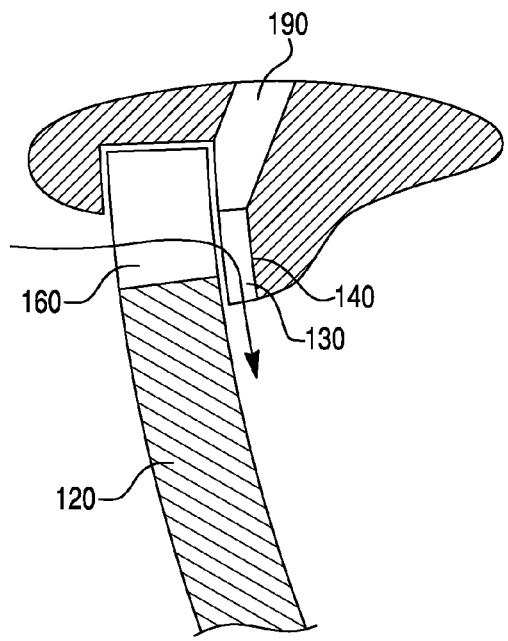
FIG. 4(b) is a cross sectional view taken along line E-E of FIG. 4(a) showing active airflow through the front vents and top frame holes.

The openings 190 can have a portion that is entirely defined and enclosed by the frame 150 and another portion jointly defined by the frame 150 and the lens 120. The openings 190 may be cylindrical and can have various cross-sectional shapes, such as circular, oval, square, rectangular, polygonal, non-symmetrical, and any other regular or irregular shape. In the example shown in FIGS. 4(b) and (c), the openings 190 extend along a first axis until they meet with the expansion chamber 130. FIG. 4(b) shows active venting while FIG. 4(c) shows passive venting in conjunction with opening 190.

The central axis of each of the openings 190 can form an angle with the substantially vertical front or rear surface of the lens 120 such that external light (e.g. sunlight) that may enter the openings 190 is directed away from the eyes of the wearer. The openings 190 can also be configured in such a way as to shade the user's eyes from overhead sunlight. For example, the openings 190 can be long enough and narrow enough to prevent sunlight from being directly incident on a user's eyes.

Figure 4C:
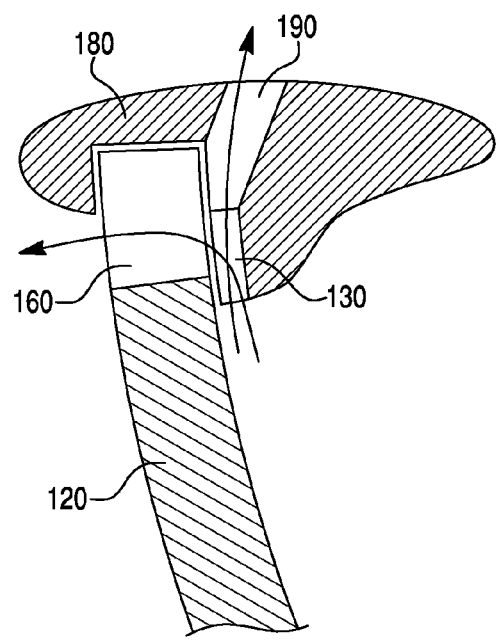
FIG. 4(c) is a cross sectional view taken along line E-E of FIG. 4(a) showing passive airflow through the front vents and top frame holes.
Figure 4E:
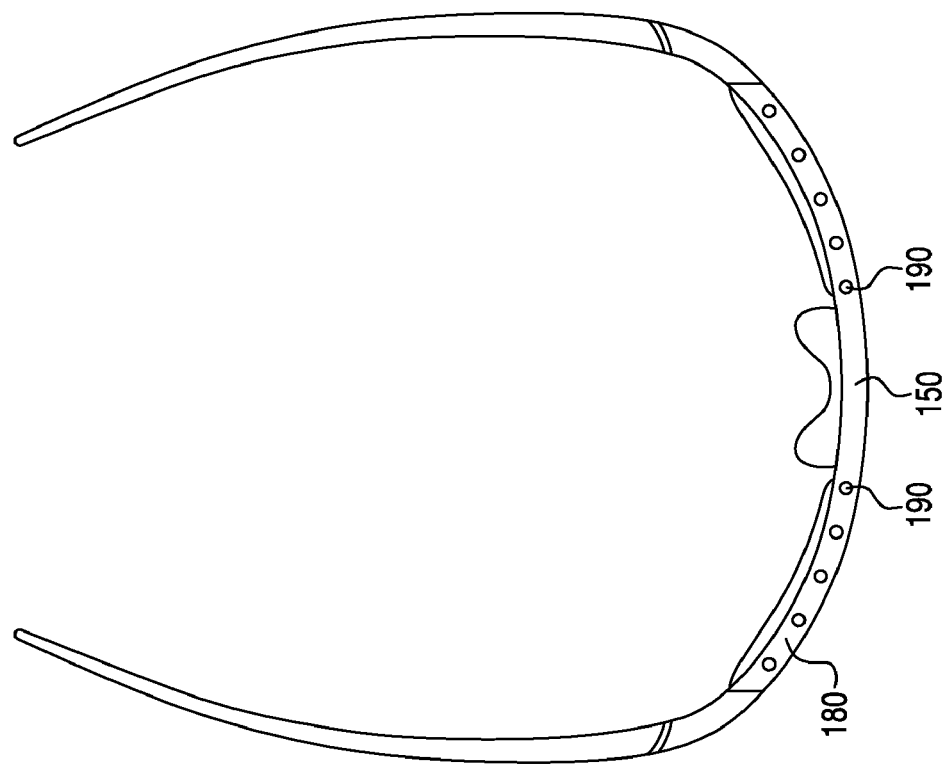
FIG. 4(e) is a top view of another exemplary embodiment of an eyewear device.

Although FIGS. 4(b)-(c) show openings 190 that have a lower portion defined by the chamber walls 140 and lens 120, alternatively, the opening(s) 190 can be entirely defined by the frame 150 and extend along a completely separate path as compared with the air path defined by the vent 160 and expansion chamber 130.

Figure 4D:
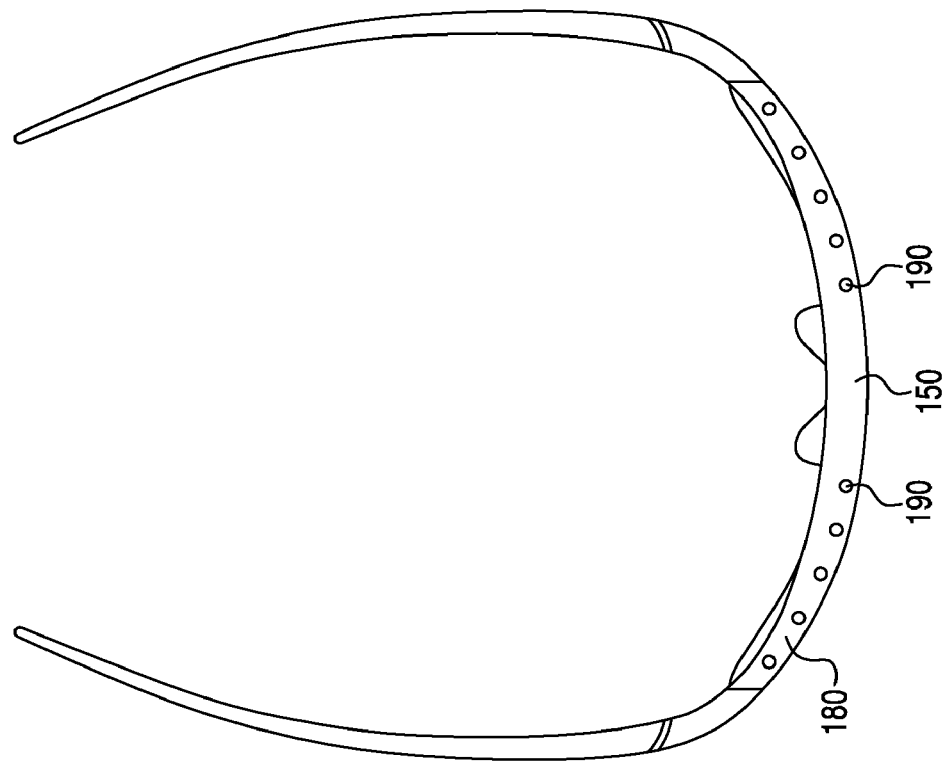
FIG. 4(d) is a top view of the eyewear device according to FIG. 4(a)

In the exemplary embodiment of an eyewear device according to FIG. 4d, the frame 150 can have a greater width in a direction substantially perpendicular to the lens 120. This increased width of the frame 150 can be viewed in comparison to another exemplary embodiment illustrated in FIG. 4(e). The increased width of the frame aides in maintaining a predetermined distance between the wearer's face and the lenses 120, while also providing additional shading for the user's eyes. This predetermined distance can reduce the amount of heat and moisture transferred from the wearer's face to the lenses and thereby can reduce or prevent the accumulation of fog on the lens(es).

Figure 5B:
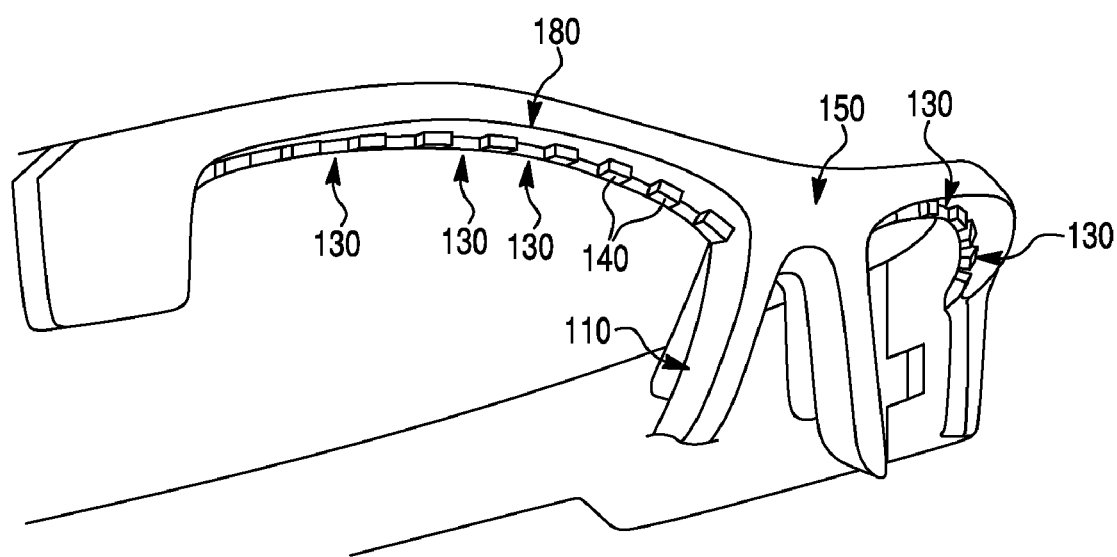
FIG. 5(b) is a perspective view of the frame of the eyewear device shown in FIG. 5(a).

In the exemplary embodiment of an eyewear device according to FIGS. 5(a)-(b), the frame 150, expansion chambers 130, chamber wall structures 140 and lens 120 can be formed and function in substantially the same manner as discussed above with regard to the other exemplary embodiments. However, the lens 120 is formed having two scalloped shaped vents 160 along the top surface. Each of the vents 160 corresponds to a plurality of expansion chambers 130. The eyewire 180 partially encircle each of the lenses 120 such that a bottom portion of the lenses is completely exposed. Similar to the embodiment of FIGS. 1(a)-(d), the chamber wall structures 140 of FIGS. 5(a)-(b) can be molded directly into and form a portion of the frame 150, or can be a separate structure that is separately attached to a front of the frame 150 to form a portion of the frame 150.

It should be noted that the above-described eyewear device may be conventional glasses or goggles, and that the glasses, goggles, or frames may be provided with two separate eyewires, for holding two separate lenses, or may be provided with one eyewire for holding one lens, and the lens or lenses may include more than one lens layer. Furthermore, the glasses, goggles, frames, or eyewire of the above embodiments may be formed of plastic, metal, one or more metallic substance, or any other suitable material. Different lenses 120 with different vent 160 configurations can be provided to allow a user to choose a particular amount and/or type of venting depending on conditions of use.

FIGS. 6A and 6B show top views another embodiment of a frame 150 made in accordance with principles of the presently disclosed subject matter. In this embodiment, frame 150 can include a single opening 190 extending through and located along the brow of the frame 150. If constructed properly, the opening 190 can provide both venting of the lens 120 and a shock absorber function. In particular, the opening 190 can be formed to extend parallel with and between the front and rear surface of the frame 150. The length of the opening 190 allows the portion of the frame 150 closest to a user's face to be somewhat flexible such that upon impact, the frame 150 of the eyewear device can absorb and spread out at least a portion of the impact force. FIG. 6A shows the opening 190 in a compressed configuration (during impact with a force of approximately 5 pounds), while FIG. 6B shows the opening 190 in an uncompressed configuration. The opening 190 can extend downward and be completely separate from the air passageway (or air passageways) that define the expansion chamber(s) 130 and vent(s) 160. Alternatively, the opening 190 can extend downward and intersect with the air passageway (or passageways) that define the expansion chamber(s) 130 and vent(s) 160.

Figure 7A:
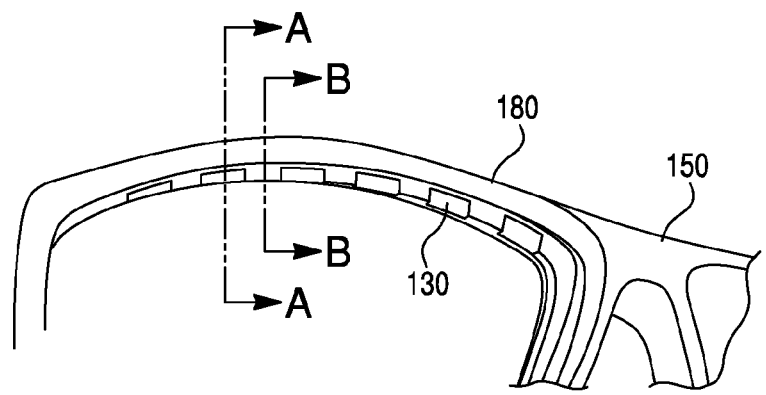
FIG. 7(a) shows a front perspective view of another embodiment of a frame made in accordance with principles of the presently disclosed subject matter.
Figure 7B:
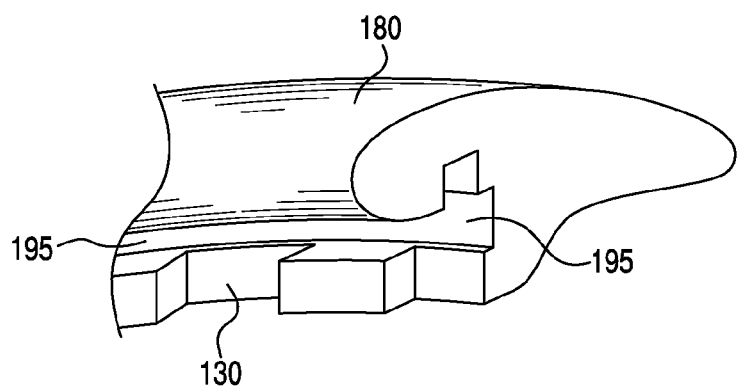
FIG. 7(b) is a magnified view of the frame shown in FIG. 7(a) and FIGS. 7(c) and (d) are cross sectional views taken along lines A-A and B-B of FIG. 7(a), respectively.
Figure 7C:
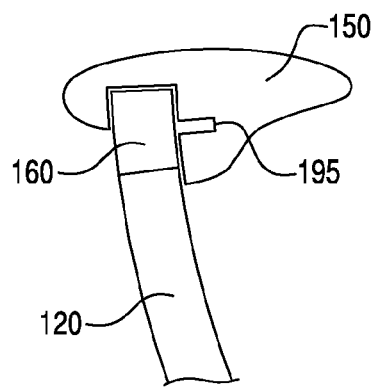
Figure 7D:
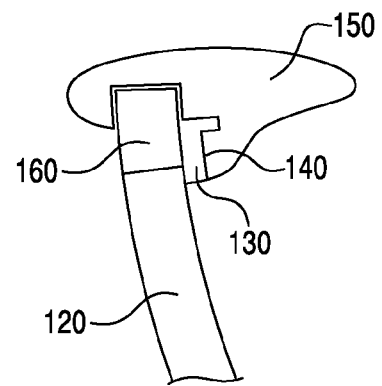

FIGS. 7A-D show another embodiment of a frame 150 and eyewire 180 made in accordance with principles of the presently disclosed subject matter. In this embodiment, frame 150 can include an expansion chamber 130 where the cross sectional shape of the expansion chamber 130 may be formed in an L-shape, as shown in FIG. 7D, having a greater depth in the direction perpendicular to the lens 120 at the top portion of the expansion chamber 130 than at the bottom portion. This greater depth can result in a greater volume in the expansion chamber 130 and can increase the flow of air between the outside and inside surfaces of the lens. Additionally, the frame 150 can include a trough or channel 195 that can extend between each of the expansion chambers 130. The channel 195 can be enclosed by the lens 120, wherein air can flow through the channel 195, between the lens 120 and the frame 150. The volume of the channel 195 can be less than the volume of the expansion chambers 130, but can improve overall air flow between each of the expansion chambers 130 and between the inside and outside surfaces of the lens 120. The channel 195 can extend around the entire perimeter of the lens 120 or only around desired portions of the lens 120, and can connect adjacent chambers 130 such that air can flow between adjacent chambers 130.

Figure 8:
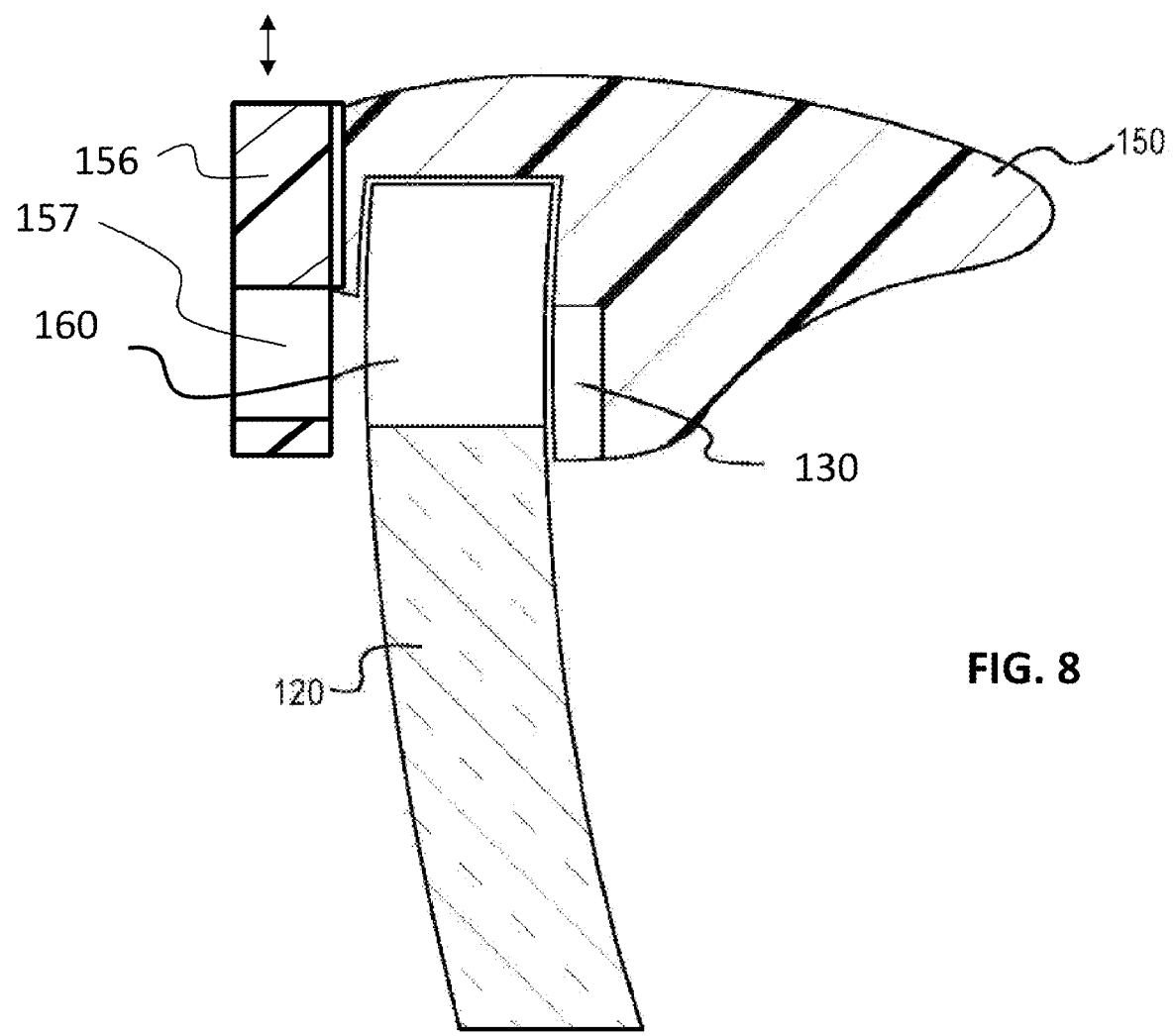
FIG. 8 shows another embodiment of a frame made in accordance with principles of the presently disclosed subject matter.

FIG. 8 shows yet another embodiment of an eyewear device made in accordance with principles of the disclosed subject matter. The frame 150 can include an adjustable front piece 156 that can move with respect to a rear portion of the frame 150. The adjustable front piece 156 can include an aperture 157 therethrough that mates with vent 160 in the lens 120. When the front piece is moved in a direction, such as shown by the arrows in FIG. 8, a user can adjust the amount and/or speed of air flow through the vent(s) 160. Alternatively, the front piece 156 can be formed as a solid shield that is moved to cover and uncover a portion of the vent 160. Still further, the front piece 156 can move in other manners, such as in a rotational manner up and away from the vents 160 (instead of up and down relative to the frame 150 as shown in FIG. 8). The front piece 156 can also be mechanically linked to the temple frames such that when a particular frame configuration is desired, the venting amount can change simultaneous with the change in frame configuration. For example, when going downhill during bicycle road racing, etc., a rider may desire to be able to look through a top portion of the lens 120 while tucked in an aerodynamic position. The frame 150 can include temple pieces that are adjustable such that the lens 120 is at a greater or different angle with respect to temple portions of the frame 150 when the bicyclist places the eyewear device in the downhill mode (as compared to when the bicyclist places the eyewear device in a level or uphill travel mode). The front piece 156 can simultaneously move to block the vents 160 when in the downhill mode so as to prevent too much airflow through the eyewear device when accelerating/travelling in the downhill mode.

FIGS. 9(a)-(f) show another embodiment of a frame made in accordance with principles of the presently disclosed subject matter. FIGS. 9(a) and (b) correspond generally to the embodiment shown in FIG. 4(b) and (c), but include an aperture in the front of the frame located immediately adjacent with and forming an air passageway through the vent 160 in the lens 120. FIGS. 9(c)-(f) show a specific relationship between a ledge 110 and the expansion chamber 130 and chamber walls 140.

With respect to all of the disclosed embodiments, the various additional components (e.g., the front piece 156 of FIG. 8) can be combined with any of the other disclosed embodiments and in accordance with the principles of the disclosed subject matter in even other embodiments.

While this disclosure has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

What is claimed is:

1. An eyewear device, comprising:
   at least one lens including an outer surface and an inner surface;
   a frame including
      an eyewire configured and dimensioned to receive the at least one lens,
      a ledge configured and dimensioned to contact the at least one lens when the eyewire receives the at least one lens, and
      at least one wall forming a chamber defined at the ledge and between the at least one lens and the frame,
   wherein the at least one wall that forms the chamber is configured to allow air to circulate between opposite sides of the at least one lens such that the circulating air strikes the at least one wall in a first direction and the wall deflects the circulating air from the first direction to a second direction that is different from the first direction.

2. The eyewear device of claim 1, wherein the frame includes a top surface and the top surface includes an opening aperture extending downward towards a rear surface of the lens.

3. The eyewear device of claim 1, wherein the frame includes a top surface and the top surface includes an opening extending downward to define a top air passageway, and the lens and frame are configured to define a front air passageway, and the top air passageway and front air passageway intersect each other at the chamber.

4. The eyewear device of claim 3, wherein the frame includes a plurality of the openings and a corresponding plurality of top air passageways, and the lens and frame are configured to define a plurality of the front air passageways, and the frame includes a plurality of the chambers, and each of the top air passageways intersects with a corresponding one of the front air passageways at a corresponding one of the chambers.

5. The eyewear device of claim 1, wherein the frame includes a top surface and the top surface includes an opening extending downward to define a top air passageway, the opening being elongate and arcuate in shape as viewed from the top surface, and extending substantially parallel with a front surface and rear surface of the frame, such that the opening allows the rear surface of the frame to substantially flex with respect to the front surface of the frame when a force is applied to the front surface of the frame.

6. The eyewear device of claim 1, wherein the at least one wall that forms the chamber extends adjacent to and substantially parallel with a rear surface of the lens.

7. The eyewear device of claim 1, wherein the outer surface of the lens is spaced from the inner surface of the lens by a perimeter surface, the lens also having a central viewing axis substantially normal to the outer surface and inner surface and located at a substantial center of the lens, and the frame includes a front surface and a rear surface, wherein the lens is located in the eyewire between the front surface and the rear surface, and the front surface extends along the outer surface of the lens towards the center of the lens and is spaced from the center of the lens by a first distance, and the rear surface extends towards the center of the lens along the inner surface of the lens and is spaced from the center of the lens by a second distance that is less than the first distance, the frame defining a first groove portion that acts as an airway and extends along the inner surface of the lens and is located between the inner surface of the lens and the frame, the frame defining a second groove portion that acts as an airway and is in communication with the first groove portion, the second groove portion located between the perimeter surface of the lens and the frame, and the second groove portion defined by a surface of the frame that is substantially normal to a surface of the frame defining the first groove portion such that air is caused to deflect and turn within the airway.

8. The eyewear device of claim 1, wherein the frame includes a front piece that is moveable with respect to a rear portion of the frame and with respect to the chamber such that an amount of air that can access the chamber can be varied by moving the front piece.

9. The eyewear device of claim 1, wherein the frame includes a plurality of walls that form a plurality of the chambers, and a further plurality of walls that form a trough extending between and connecting adjacent chambers such that air can flow between adjacent chambers.

10. An eyewear device, comprising:
at least one lens including a plurality of vents to allow air to flow between opposite sides of the at least one lens, the vents defined by an outermost peripheral edge of the lens, wherein the vents in the lens extend from the outermost peripheral edge towards a central area of the lens; and
a frame including an eyewire receiving the at least one lens, a front surface of the frame located in front of the lens and extending downward, and a rear surface of the frame extending downward such that the lens is located between the front surface and rear surface of the frame, the rear surface extending further towards and being located closer to the central area of the lens than is the front surface.

11. The device of claim 10, wherein the frame includes an expansion chamber in fluid communication with the plurality of vents to allow air to flow between opposite sides of the at least one lens.

12. The eyewear device of claim 10, wherein the frame includes a top surface and the top surface includes at least one opening extending downward towards a rear surface of the lens.

13. The eyewear device of claim 10, wherein the frame includes a top surface and the top surface includes at least one opening extending downward to define a top air passageway, and the lens and frame are configured to define a front air passageway, and the top air passageway and front air passageway intersect each other at an expansion chamber that is in fluid communication with at least one of the plurality of vents to allow air to flow between opposite sides of the at least one lens.

14. The eyewear device of claim 13, wherein the frame includes a plurality of the openings and a corresponding plurality of top air passageways, and the lens and frame are configured to define a plurality of the front air passageways, and the frame includes a plurality of the chambers, and each of the top air passageways intersects with a corresponding one of the front air passageways at a corresponding one of the chambers.

15. The eyewear device of claim 10, wherein the frame includes a top surface and the top surface includes an opening extending downward to define a top air passageway, the opening being elongate and arcuate in shape as viewed from the top surface, and extending substantially parallel with a front surface and rear surface of the frame, such that the opening allows the rear surface of the frame to substantially flex with respect to the front surface of the frame when a force is applied to the front surface of the frame.

16. The eyewear device of claim 10, wherein the rear surface of the frame extends substantially parallel with and is alternatively spaced from and in contact with an inner surface of the lens to define a plurality of air passageways in the frame.

17. A method of making an eyewear device, comprising:
providing at least one lens with an outer surface and an inner surface;
providing a frame including an eyewire configured and dimensioned to receive the at least one lens, and a chamber surface located behind the inner surface of the lens such that the chamber surface is located closer to a user when the eyewear device is worn properly by a user; and
allowing air to circulate between opposite sides of the at least one lens by circulating air such that the air strikes the chamber surface in the frame located behind the inner surface of the lens in a first direction, and by deflecting the circulating air from the first direction to a second direction that is different from the first direction using the chamber surface located behind the inner surface of the lens.

18. The method of claim 17, further comprising providing a plurality of vents in the lens to allow air to circulate between the inner surface and the outer surface of the at least one lens.

19. The method of claim 17, further comprising providing an expansion chamber inside the frame, wherein the expansion chamber is located between the frame and the inner surface of the lens.

* * * * *